(12) United States Patent
Grefenstette et al.

(10) Patent No.: US 6,498,567 B1
(45) Date of Patent: Dec. 24, 2002

(54) GENERIC HANDHELD REMOTE CONTROL DEVICE

(75) Inventors: Gregory Grefenstette, Gieres (FR); Francois Pacull, Crolles (FR); Max Copperman, Santa Cruz, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/466,822

(22) Filed: Dec. 20, 1999

(51) Int. Cl.⁷ .............................................. G08C 19/00
(52) U.S. Cl. ............................ 340/825.62; 340/825.72; 340/10.4; 340/10.5
(58) Field of Search ..................... 340/568.1, 570, 340/825.49, 825.62, 825.72, 825.22, 825.37, 10.4, 10.5, 10.51, 10.6; 359/142, 146, 147

(56) References Cited

U.S. PATENT DOCUMENTS

| | | | | |
|---|---|---|---|---|
| 4,728,949 A | * | 3/1988 | Platte et al. | 340/825.37 |
| 5,081,534 A | * | 1/1992 | Geiger et al. | 340/825.69 |
| 5,553,311 A | * | 9/1996 | McLaughlin et al. | 395/884 |
| 5,579,221 A | * | 11/1996 | Mun | 340/825.37 |
| 5,648,813 A | * | 7/1997 | Tanigawa et al. | 348/461 |
| 5,657,005 A | * | 8/1997 | Seebeck et al. | 340/825.72 |
| 5,802,467 A | * | 9/1998 | Salazar et al. | 348/825.72 |
| 6,005,490 A | * | 12/1999 | Higashihara | 340/825.72 |
| 6,097,520 A | * | 8/2000 | Kadnier | 340/825.62 |
| 6,131,111 A | * | 10/2000 | Yoshino et al. | 709/204 |

FOREIGN PATENT DOCUMENTS

JP        10276478 A    * 10/1998

* cited by examiner

Primary Examiner—Van Trieu
(74) Attorney, Agent, or Firm—Oliff & Berridge, PLC; Eugene O. Palazzo

(57) ABSTRACT

A system and remote control device that controls an appliance, and obtains a desired function of the appliance, by invoking a remote procedure call in a remote server which will thereby actually control the appliance. The remote control device comprises a sensor; sensor responsive means for capturing information provided by the sensor, wherein the captured information at least contains parameters representative of the identification of the appliance, user-profile parameters, parameters representative of the address of the remote server, and a function name indicating the function to be performed by the appliance; marshalling means for encoding the captured information and for packaging the captured information into data in a remote procedure call format; and a transmitter for establishing a communication protocol with the remote server in order to transmit the packaged data to the remote server so that the remote server may execute the remote procedure call.

16 Claims, 2 Drawing Sheets

GENERIC HANDHELD REMOTE CONTROL DEVICE

BACKGROUND OF THE INVENTION

The present invention relates generally to a generic handheld remote control device for controlling the operation of an appliance such as, e.g., a VCR, a TV, a microwave oven, a washing machine or the like. The present invention also relates to a system incorporating such a remote control device, and to a process for carrying out the control operation between a remote control device and an appliance to be controlled.

Various remote control devices are known for controlling, e.g., a VCR. Such a remote control device comprises many buttons, each assigned to a specific task. For instance, an "on/off" button may be provided on the remote control device for switching on or off the VCR, a "record" button for starting recording etc. Generally, a user presses the specific button in order to obtain a desired result, i.e. by pressing a specific button on the remote control, the VCR will carry out a desired operation.

Furthermore, so-called universal remote controllers are known which may be programmed by several standard remote control devices provided with each appliance. Then, each button on the universal remote control is assigned several functions depending on the selected mode of operation. Thus, such a universal remote control may operate not only the VCR, but also a TV, a compact disk player or the like.

However, the number of buttons available on the remote controller always limits the operations that may be executed. If a large number of buttons are provided, the remote controller becomes bulky, expensive and so complicated that most users will not even use it, and there still is a limitation in operation or function that may be controlled due to the limited set of buttons.

Furthermore, the so-called universal remote controller is limited to a specific number of appliances that may be controlled, because a specific memory and associated control logic must be provided for each appliance that may be operated. Generally, such universal remote controllers may operate about four distinct appliances. Thus, if a new appliance is to be controlled, either a former appliance must be deleted from the memory of the universal remote controller, or the separate remote control device provided with the new appliance, if any, should be used.

Moreover, if the new appliance has new functions, it is not always easy to assign a specific button on the universal remote controller in an understandable manner to this new function. For example, a compact disk player may have a function called "random play", whereas the universal remote controller only has a button called "play".

Clearly, such remote control devices are not ergonomic due to the fact that they are complicated in use.

Other prior art remote control devices are known. For instance, a VCR with its remote control device is commercialized by the company Panasonic® in which the remote control device is provided with a LCD-display and with a bar-code reader to enter programming details into the VCR. By scanning an appropriate bar code, the remote control device decodes the inputted information and displays the programmed operation.

FIGS. 1a and 1b are schematic representations of the operation of such a conventional remote control device. In FIG. 1a, the user holds the remote control device 1 above a paper 2 containing bar codes 3 and scans the appropriate codes using the provided scanner 4. This scanned information is decoded in the remote control device 1 which then generates VCR commands and displays the program on the LCD screen 5 so that the user may check the operation. In FIG. 1b, the user then presses a "send" button on the remote control device 1 to send the programmed operation to a VCR 6. Thus, all the logic is hard-coded in the remote control device which is thus expensive to manufacture, and very task-specific. Indeed, if new functions are available for the VCR, a new remote control device must be provided as the hard-coded logic must be re-programmed.

It may thus be understood that the known devices suffer from a lack of generality of application, with a new design being necessary for every new group of tasks to be treated.

SUMMARY OF THE INVENTION

It is, therefore, an object of the present invention to provide a true generic remote control device which is easy to use and which does not have to be changed or altered or re-engineered in order to change the service or operation that the device invokes.

It is another object of the present invention to provide such a device, which is simple, easy to manufacture, small in size and low in cost.

Another object of the present invention is to provide a system incorporating such a remote control device.

Another object of the present invention is to provide a process for carrying out the control operation between a remote control device and an appliance to be controlled.

Therefore, the present invention concerns a generic remote control device as defined in present claim 1.

The present invention also concerns a system according to claim 6, and a process according to claim 9.

Thus, the inventive device collects parameters from the physical world, encodes these parameters for transmission to a remote server, captures and encodes the function name of the procedure to be called on the remote server, encodes the destination that is to receive the results produced by the remote server, sets up a transmission between the remote control device and the remote server, and transmits the packaged, encoded data to the remote server that will then execute the remote procedure call, thereby resulting in the desired operation of the appliance.

Thanks to the present invention, it is possible to break through the rigidity of the prior art through its explicit recognition that the task to be performed can be symbolically encoded and transmitted along with the data on which the task is to be performed, using the same philosophy contained in the digital computer world concept of a remote procedure call.

Thus, the present inventive device embodies a remote procedure call in a physical device. Consequently, the present invention offers a wide variety of possible implementations by describing what elements must be present in a physical embodiment of a remote procedure call and by describing how these elements can be technologically realized.

BRIEF DESCRIPTION OF THE DRAWINGS

Other features and advantages of the inventive remote control device according to the present invention will become clear from reading the following description, which is given solely by way of a non-limitative example thereby referring to the attached drawings in which.

DETAILED DESCRIPTION OF THE PREFERRED EMBODIMENT

Figure 1A:
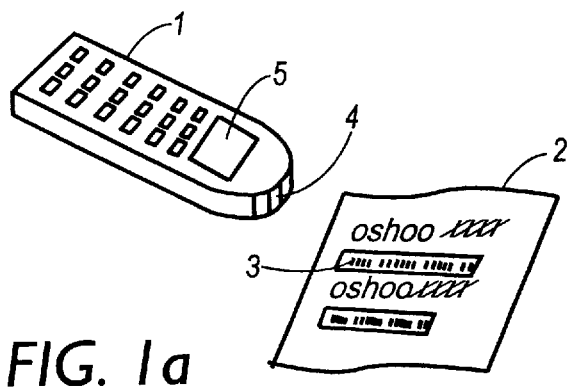
FIGS. 1a and 1b is a schematic representation of the already mentioned conventional remote control device.
Figure 1B:
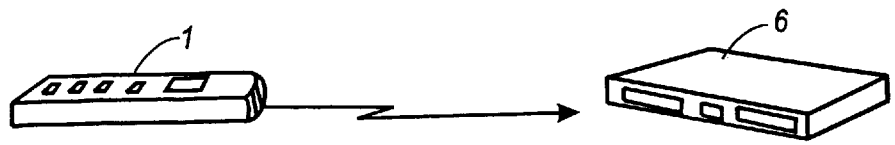
Figure 2:
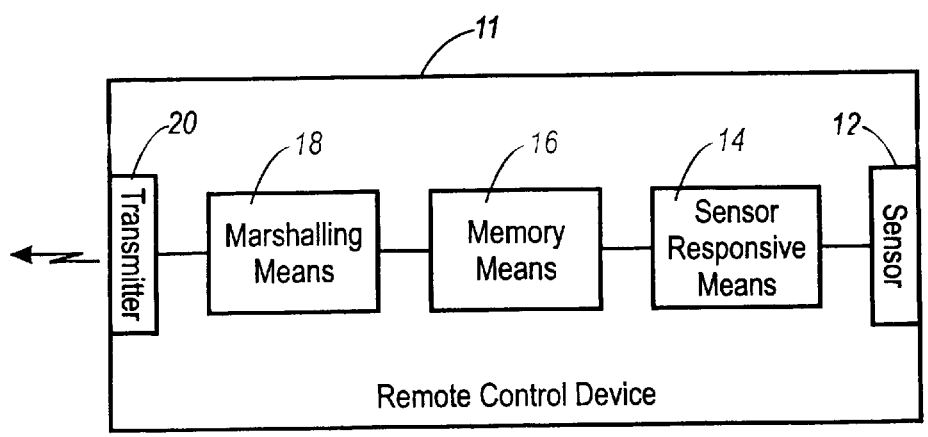
FIG. 2 is a schematic representation of a preferred embodiment of the remote control device according to the present invention.

Referring now to FIG. 2, a preferred embodiment of a handheld remote control device according to the present invention is indicated by general reference 11.

Remote control device 11, hereafter also referred to as RC-device 11, comprises at least one sensor 12, e.g., a bar code scanner, a magnetic strip reader, a camera, a thermometer, a microphone, an active badge or the like, which is associated with sensor responsive means 14, such as an electronic circuit, for capturing information such as parameters, as will be explained in more detail further on. In this example, the sensor is a scanner such as a bar code scanner. The information to be scanned may be available on a piece of paper such as a paper menu containing parameters such as bar codes, or glyphs or the like. The different types of bar codes or glyphs represent parameters and function names indicative of a desired operation or functioning of an appliance which is to be controlled by the RC-device. Thus, such a paper menu contains glyphs or bar codes for all possible operations of an appliance, such as "on/off", "volume up/down", "stop", "record", etc. The RC device 11 also comprises memory means 16 for storing the parameters and function name as information captured by the sensor 12. Marshalling means 18 are further provided which are connected to memory means 16 for receiving the stored information comprising the parameters and function name and for encoding this information into packaged data. This data is packaged according to the invention into a remote procedure call format.

A remote procedure call format as such is well known in the computer world, and basically means that a caller, the so-called client, e.g., a program on a first computer may call upon a remote server, e.g., another program, which is located on a different computer, by invoking a remote procedure call, hereafter also referred to as an RPC, to carry out a specific task (a procedure) and then to return the result to the caller. For example, a database server process may execute concurrently with many client processes, which request services of the database process. A client process, i.e. the client may request services by issuing an RPC. The RPC allows a server process, i.e. the server to invoke a server procedure on behalf of the client. To issue the RPC, the client packages the procedure name and the actual in-parameters for the procedure into an interprocess communications message and sends the information to the server. The server receives the message, unpackages the procedure name and any actual in-parameters, and invokes the named procedure, passing it the unpackaged in-parameters. When the procedure completes, the server packages any out-parameters into a message and sends the message to the client. The client receives the message and unpackages the out-parameters. The process of packaging parameters is known as marshalling and the process of unpackaging as unmarshalling. For more detailed information on RPC and marshalling, reference is made to, e.g., the international patent application publication no. WO94/11810.

The marshalling means 18 contained within the RC-device 11 are also connected to a transmitter 20. Transmitter 20 sets up a communication link and transmits the RPC to a remote server that executes it. The communication mechanism may of course vary and could, e.g., relate to radio transmission, infrared or docking. RC-device 11 may also comprise a transmission interface, not shown, to indicate the transmission, e.g., by way of blinking lights or the like as is well known from, for example, modems.

RC-device 11 may further comprise a receiver for receiving confirmation of the execution of the RPC. Advantageously, such receiver may be combined with the transmitting as a transceiver.

Figure 3:
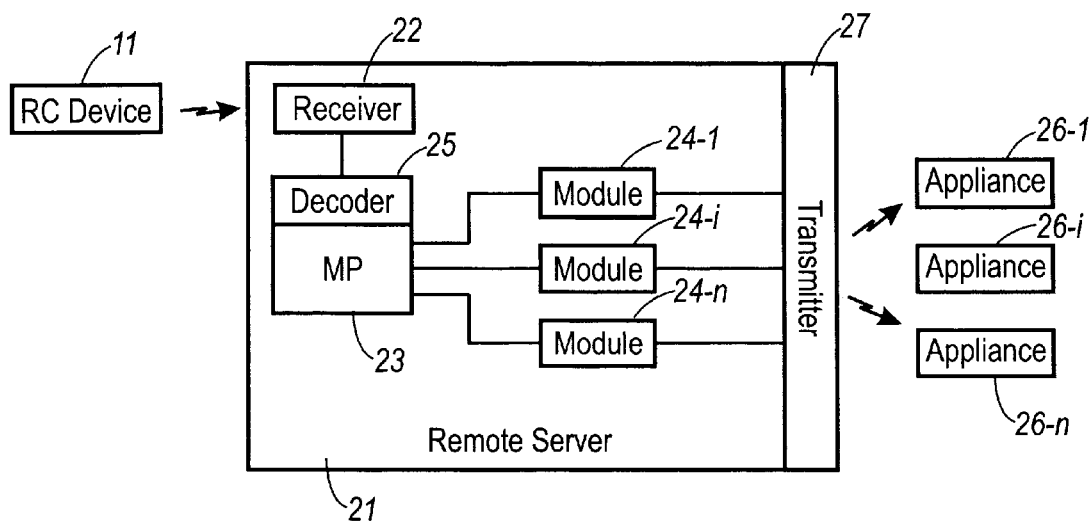
FIG. 3 is a schematic view of a system according to the present invention comprising a remote control device as shown in FIG. 2.

FIG. 3 shows a system invoking a remote procedure call according to the present invention. The system comprises an RC-device 11 as described above, and further comprises a remote server, or service provider 21. The service provider 21 may be a microcomputer or the like and comprises a first receiver 22 for receiving the packaged data sent by RC-device 11. First receiver 22 is connected to a decoder 25 for decoding the received data. The decoder may form part of a logic means such as a microprocessor 23 which unmarshals the decoded data to determine the RPC and looks up a corresponding function in an RPC function name server. This function is the desired function that the user of the RC-device wants to obtain from a certain appliance, such as a VCR or a microwave oven, and is contained within the packaged data as a function name stored within the context of the further provided parameters, as will be explained in detail further on. Thus, the service provider executes the RPC by translating the received information from the RC-device and by providing the correct function code to operate the appliance. It may thus be understood that the RC-device is the client invoking an RPC in the service provider functioning as the remote server.

The parameters further contained in the unpackaged data also indicate the identification of the appliance which is to be operated. To this effect, the service provider 21 further comprises at least one electronic module 24-1 which is dedicated to the appliance to be controlled. If there are a number of "n" appliances which may be controlled by the service provider, there will be "n" modules, referenced 24-1, . . . 24-i, . . . 24-n, each associated with a specific appliance 26-1, . . . 26-i, . . . 26-n. Each module 24-i comprises its own logic circuit or means for receiving the appropriate function name. The service provider thus sends the function to the appropriate module identified by the parameters. The module then converts the function name into specific control data, i.e. operational code which is understandable for the associated appliance.

It may thus be understood that each time an appliance is added to the configuration, for instance to the household of the user, the appropriate module should be loaded into some service provider. This module could be a simple card that is inserted into a slot provided therefor in the service provider. Also, the module could be software that is simply downloaded into the service provider. As each module has a list of possible functions that may be carried out, the total list in a service provider could then be automatically updated according to the change of modules. However, it is also possible that the service provider simply checks the list of functions in the appropriate module as indicated by the identification parameters of the appliance.

Service provider 21 further comprises a first transmitter 27 for transmitting the converted specific control data to the appliance to be controlled so that the appliance may carry out the desired function. Of course, this transmitter may form part of the electronic module 24-1, . . . 24-i, . . . 24-n so that each module can control a specific appliance. In this case, there may of course be a corresponding number of first transmitters, 27-1, . . . 27-i, . . . 27-n (non-represented), each associated with a module, instead of first transmitter 27.

Again, the manner in which the data are transmitted may be, e.g., infrared or radio or the like. Preferably, this manner corresponds to the operation of the receiver that is normally already provided in the appliance. For instance, a VCR usually comprises an infrared receiver responsive to the specific remote controller provided with the VCR. In such a case, first transmitter 27 will transmit the data in a similar infrared manner so that the appliance can receive the operation code without requiring any modification of the appliance as such.

Service provider 21 may thus be realized as a small black box at least comprising first receiver 22 responsive to the generic RC-device, logic means 23 for translating the received data, and a first transmitter 27 for sending the converted data to the appliance to be controlled.

Instead of having one central service provider, it is also possible to incorporate distributed service providers, each having one module, in each appliance to be controlled. Such service provider may for instance be arranged to be linked with the standard infrared receiver of the appliance and then receives the generic function name with the associated parameters as scanned by the RC-device so as to translate or convert the generic function name into the understandable control code required to actually make the appliance operate.

Advantageously, service provider 21 may further comprise a second transmitter, not referenced, for transmitting an acknowledgment signal to RC-device 11 so as to inform the user that the data has been correctly received. Such second transmitter may of course be combined with the first receiver 22 as a transceiver.

In another embodiment, service provider 21 may further be provided with a second receiver, not referenced, for receiving a response signal from the controlled appliance. In such a case, the appliance must of course be modified to allow for transmission of such a response signal. This signal may indicate that the desired function has been performed or not. Such a response signal may then also be re-transmitted to RC-device 11 so that the user may know that the desired operation has indeed been carried out.

Figure 4:
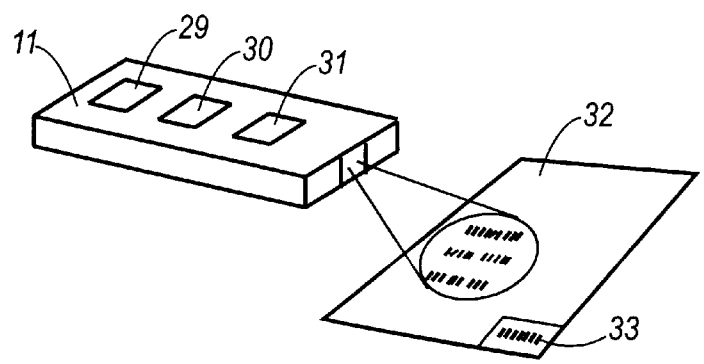
FIG. 4 is a schematic representation of an example of a process for carrying out a remote control according to the present invention.

Hereafter, an example describing the operation of the system will be given with reference to FIG. 4. In this example, the appliance to be controlled by the generic RC-device according to the present invention is a VCR. However, the appliance is of course not limited to a VCR, but may be any electromechanical device or apparatus, such as, for example, a TV, a microwave oven or a dishwasher.

RC-device 11 may be a hand-held scanner equipped with an infrared transmitter as well as with memory means. The device may have three buttons 29, 30, 31, respectively labeled, for example, "function", "parameter" and "go". The user scans in any order a function name and a set of parameters, distinguishing between them with the buttons "function" and "parameter". Thus, pressing the appropriate button may activate different scanning modes.

For example, the user holds RC-device 11 over a paper. The paper may be a regular newspaper containing, e.g., a TV program section listing the scheduled transmissions of the different TV-show. As already mentioned, the paper may also be a paper menu 32 comprising a series of glyphs or barcodes or the like corresponding, e.g., to scheduled times indicating the start and the end of a TV-show, i.e. the glyphs can simply represent time indications, and corresponding to possible functions such as "on/off", "record" etc., allowing the user to scan these to enter the information into the RC-device. Paper menu 32 may comprise itself a glyph 33 identifying the paper as such. Thus, when the user scans the paper using the RC-device when pressing the "parameter" button 30, the RC-device 11 "recognizes" the paper menu and stores this identification parameter into its memory means. Next, the user scans, again when pressing the "parameter" button, the program to be recorded, either by scanning an appropriate barcode, or start and stop times etc. These parameters are also stored in the memory means of RC-device 11. The following step is to enter the identification of the appliance which is to carry out the desired operation, i.e. in the present example the identification of the VCR which is to be programmed to record a specific TV-show. The identification parameter of the appliance is then also stored in the memory means when scanning with the "parameter" button 30 pressed. Such identification parameters may again be available as a glyph or as a bar code, which is added to the paper menu when the appliance becomes part of the operational configuration to be controlled by the RC-device.

An advantageous realization of the sensing of the appliance identification parameter consists in pointing the RC-device to the appliance, activating a sensor active button, and receiving the identification parameter directly from the appliance. In such a case, the appliance must of course be arranged to regularly transmit such identification information. A way of embodying this automatic identification sensing may be done similar to the operation of an active transponder system. Thus, the VCR would then contain a transponder, and the RC-device a corresponding base station. When the base station, i.e. the RC-device is directed towards the transponder, i.e. the VCR, a signal transmitted continuously by the VCR will be modulated allowing the base station to detect the identification of the transponder. The basic principle of transponder operation being of course well known in the state of the art, it will not be further described here.

Next, the user also scans the function name of the operation to be performed. This function name may again be a glyph representing the function such as "record" on a paper menu, which may be the same paper menu 32 or a different one. This paper menu thus contains a full list of all possible functions, each function being represented by a glyph or a bar code. In this respect, the button "function" 29 should be pressed when scanning this information. Thus, the RC-device merely scans a generic function name, but does not actually contain the code required to control an appliance which should carry out this function.

Thus, each function name must be scanned by RC-device 11, whether this be "on/off" and "record" or "play" for a VCR, or "full power" "microwave and grill" for a microwave/grill-combination oven.

Thus, the memory means 16 (see FIG. 2) of RC-device 11 now comprise the captured information consisting of a parameter representative of the identification of the appliance, i.e. the VCR, parameters indicating a program start and stop time, and the name of a function to be performed by the VCR.

Finally, the user must enter the identification of the remote server, i.e. of the service provider who will execute the remote procedure call. This identification information may again be entered in a similar manner as the other information, but it could also be just programmed once in the RC-device, for example, in the case that there is only one remote server in the particular household of the user.

Following the sensing operation, the user presses the "go" button 31 and RC-device 11 adds any pre-stored user profile to the set of parameters and sends this set together with the function name in RPC-format via its transmitter 20 to the identified service provider.

Again, RC-device 11 may possess only two buttons, one which is pressed to garner functions or parameters, the former functions being encoded with some special symbols which distinguish function names from parameter values. Likewise, the RC-device may possess only one button in which functions and parameters are acquired by, e.g., one click of the button, and the "go" operation is realized by a double-click.

Receiver 22 of the remote server, i.e. the service provider will receive all this information, unpackage and unmarshall the data and execute the RPC, i.e. it will translate the function to be performed by the identified appliance into a control code understandable for the appliance. Then, the service provider sends this control code via its transmitter 27 to the VCR so that the latter will be programmed.

Thanks to the RC-device and system according to the present invention, it is thus possible to provide a generic RC-device, which could contain as little as one button, but which can operate any appliance. The RC-device is thus truly generic and simple in use. Also, if a new appliance is added to the household of the user, it suffices to modify the service provider, e.g., by adding a further module dedicated to the appliance, the new appliance may be controlled by the same generic RC-device without having to change the RC-device.

In a variant and in order to facilitate basic operations which are almost universal for most appliances such as "on/off", "volume up" "volume down", it is also possible to provide several extra buttons on the RC-device which would have these function names pre-programmed. Thus, the user only has to press the appropriate button to turn on or off an appliance without first having to scan the function name. The RC-device will then still only have very few buttons compared to usual remote controllers so that it may be easy to use, small in size, cheap and truly generic.

Another variant for facilitating use is to provide the remote server, i.e. the service provider with a screen allowing to display a menu of the functions available for an appliance or even to display the full list of function names stored in the service provider. The user may thus select the desired function from the on-screen menu instead of having to first input the function name into the RC-device by scanning a paper menu. A specific button could then be further provided on the RC-device, such as a "function call" button, which will trigger the displaying of the on-screen menu. The manner in which such functioning may be realized is of course known as such. The incorporation of such functioning in the system described here is thus well within the capabilities of a person skilled in the art, so that no further detailed explanation is provided here.

In another variant, the RC-device according to the present invention may be provided with several generic preference buttons labeled, e.g., as "A", "B", "C" etc. Each generic button may be configured by the user to program a set of parameters corresponding to a preference of the user or to a function the user carries out a lot. Thus, the above described manner of inputting parameters and a function name into the RC-device need only be done once for such preferred functions. An example is to program one of these preference buttons to switch on the TV at 8 PM to channel 4, because the user likes to watch the TV-show starting at that time on that channel. Thus, the user inputs the parameters and functions necessary to obtain such an operation in the above described manner, and associates the stored information with his preferred button, e.g. by pressing for a certain length of time on button "A". Clearly, such functioning would imply a slight modification of any logic means in the RC-device.

The fact that the RC-device physically embodies a remote procedure call in the service provider allows for a flexible multifunctional RC-device which does not have to be changed or altered or re-engineered in order to change the service that this RC-device invokes, because the functions the RC-device calls are not hard-coded in the RC-device itself. Any changes due to configuration modification of available appliances are simply re-programmed into an appropriate module of the service provider. Thus, thanks to the fact that the service provider is upgradeable, new functions associated with new appliances may also be remotely controlled by the same generic RC-device according to the present invention.

Having described a preferred embodiment of this invention, it will now be apparent to one of skill in the art that other embodiments incorporating its concept may be used. It is felt, therefore, that this invention should not be limited to the disclosed embodiment, but rather should be limited only by the scope of the appended claims.

What is claimed is:

1. A generic handheld remote control device for controlling an appliance, in order to obtain a desired function of said appliance, by invoking a remote procedure call in a remote server which will thereby actually control said appliance, wherein the remote control device comprises:

a sensor;

sensor responsive means for capturing information provided by the sensor, wherein said captured information at least contains parameters representative of the identification of said appliance, user-profile parameters, parameters representative of the address of said remote server, and a function name indicating a function to be performed by said appliance;

marshalling means for encoding the captured information and for packaging the captured information into data in a remote procedure call format; and a transmitter for establishing a communication protocol with said remote server in order to transmit the packaged data to said remote server so that said remote server may execute, via a transmitter of the remote server, the remote procedure call according to a module of the remote server corresponding to the packaged data for the appliance.

2. The device according to claim 1, wherein a receiver is further provided for receiving an acknowledgement signal from said remote server if said captured information has been correctly transmitted to said remote server, and for receiving an error signal if said captured information has not been correctly transmitted to said remote server.

3. The device according to claim 1, wherein said remote control device further comprises at least one operational button arranged to activate said sensor and said sensor responsive means.

4. The device according to claim 3, wherein said remote control device further comprises at least a second operational button arranged to activate said transmitter.

5. The device according to claim 1, wherein said remote control device further comprises user-programmable buttons for programming preferred operations.

6. The device according to claim 1, wherein universal pre-programmed function buttons are further provided for allowing control of universal functions.

7. The device according to claim 1, wherein said sensor is a bar-code reader, a magnetic strip reader, a scanner, general purpose camera, a thermometer, an electronic tag reader, or a microphone.

8. A multi-functional remote control system comprising:
a generic remote control device for controlling an appliance by invoking a remote procedure call in a remote server which will thereby actually control said appliance, wherein the remote control device comprises:
a sensor;
sensor responsive means for capturing information provided by the sensor, wherein said captured information at least contains
parameters representative of the identification of said appliance,
user-profile parameters,
parameters representative of the address of said remote server, and
a function name indicating a function to be performed by said appliance;
marshalling means for encoding the captured information and for packaging the captured information into data in a remote procedure call format; and
a transmitter for establishing a communication protocol with said remote server in order to transmit the packaged data to said remote server so that said remote server may execute the remote procedure call, and wherein the system further comprises:
a remote server comprising:
a first receiver for receiving the packaged data sent by the remote control device,
a decoder for decoding the packaged data,
logic means for receiving the decoded data, for executing the remote procedure call, for forwarding the results to an appropriate module according to the parameters contained within the data,
at least one of said appropriate modules, each module being dedicated to an appliance to be controlled, and containing logic circuit means for receiving data representing said results, and for converting said data into control data understandable for the associated appliance, and
a first transmitter for transmitting the converted data to the appliance to be controlled so that said appliance may carry out a desired function.

9. The system according to claim 8, wherein each module comprises its own first transmitter.

10. The system according to claim 8, wherein said remote server controls the power supply activation of said appliance.

11. The system according to claim 8, wherein said remote server further comprises a display for displaying on-screen menus.

12. The system according to claim 8, wherein said appliance is a TV, a video tape recorder, A DVD-player, a CD-player or any other HI-FI device.

13. The system according to claim 12, wherein said remote server controls the volume control of said appliance.

14. The system according to claim 8, wherein said appliance is a washing machine, a dishwasher, a microwave oven, or any other kitchen appliance.

15. An appliance for use in the system according to claim 8, wherein said remote server is incorporated in said appliance.

16. A process for carrying out a control operation between a generic remote control device and an appliance to be controlled by invoking a remote procedure call in a remote server which will thereby actually control said appliance, said generic remote control device at least comprising an input sensor for inputting information, wherein the process comprises the following steps:
activating a first mode of information inputting of said generic remote control device,
inputting with said sensor of said remote control device information containing at least parameters representative of the identification of said appliance, and of the address of said remote server,
activating a second mode of information inputting of said remote control device,
inputting with said sensor of said remote control device a function name to be performed by said appliance,
activating a communication mode of said remote control device for marshalling the inputted information into packaged data under a remote procedure call format, for setting up a communication protocol with said remote server, and for transmitting the packaged data to said remote server,
receiving said packaged information by said remote server,
unmarshalling said packaged information so as to execute said remote procedure call in said remote server, wherein said remote procedure call converts the function name inputted by said remote control device into control data code specific to said appliance according to a module of the remote server corresponding to the packaged information for the appliance, and
sending said control data code, via a transmitter of the remote server, to said appliance in order for it to perform said function.

* * * * *